Figure 8:
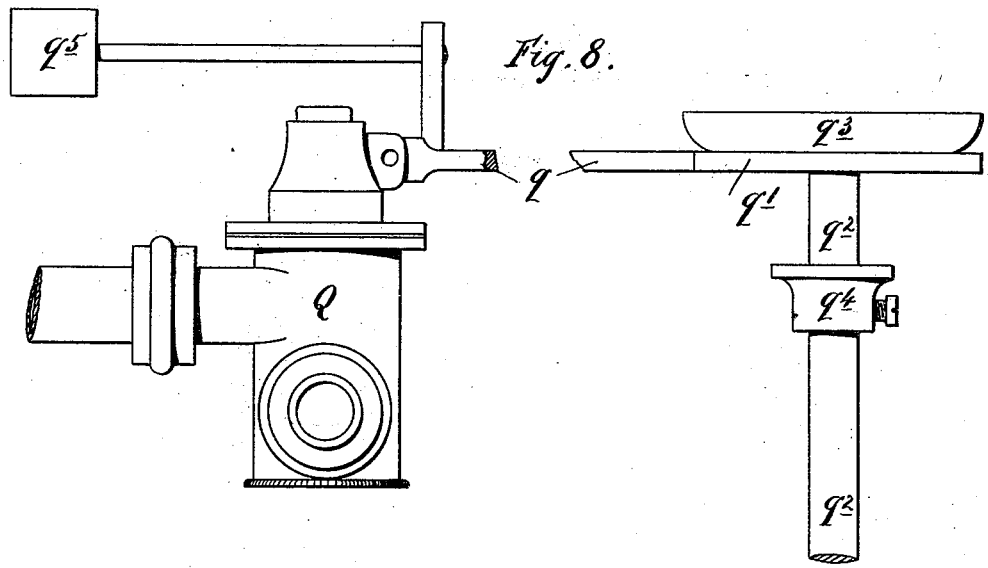

(No Model.) 6 Sheets—Sheet 1.
W. COWAN.
APPARATUS FOR CONTROLLING FLOW AND PRESSURE IN GAS MAINS.
No. 550,218. Patented Nov. 19, 1895.
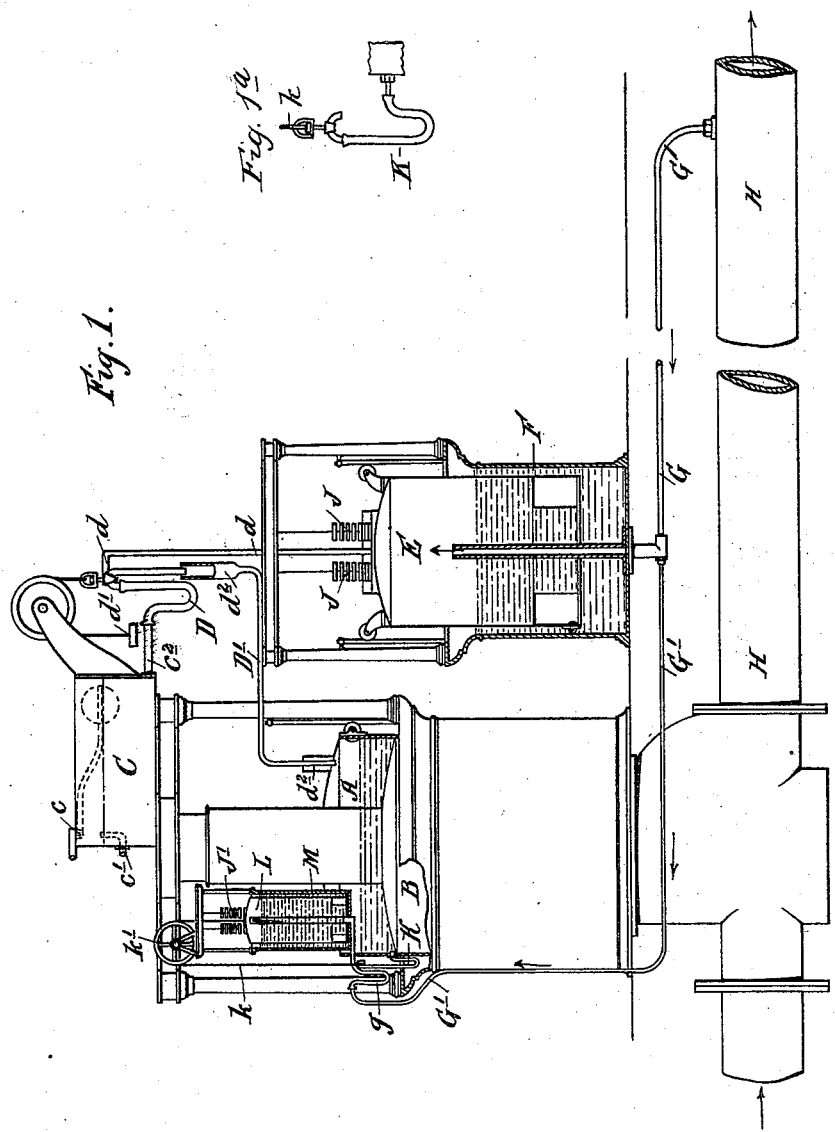
Witnesses:
L. C. Hills
Ewell A. Dick
Inventor
William Cowan
by Muralen Bailey
his attorney (No Model.) 6 Sheets—Sheet 2.
W. COWAN.
APPARATUS FOR CONTROLLING FLOW AND PRESSURE IN GAS MAINS.
No. 550,218. Patented Nov. 19, 1895.
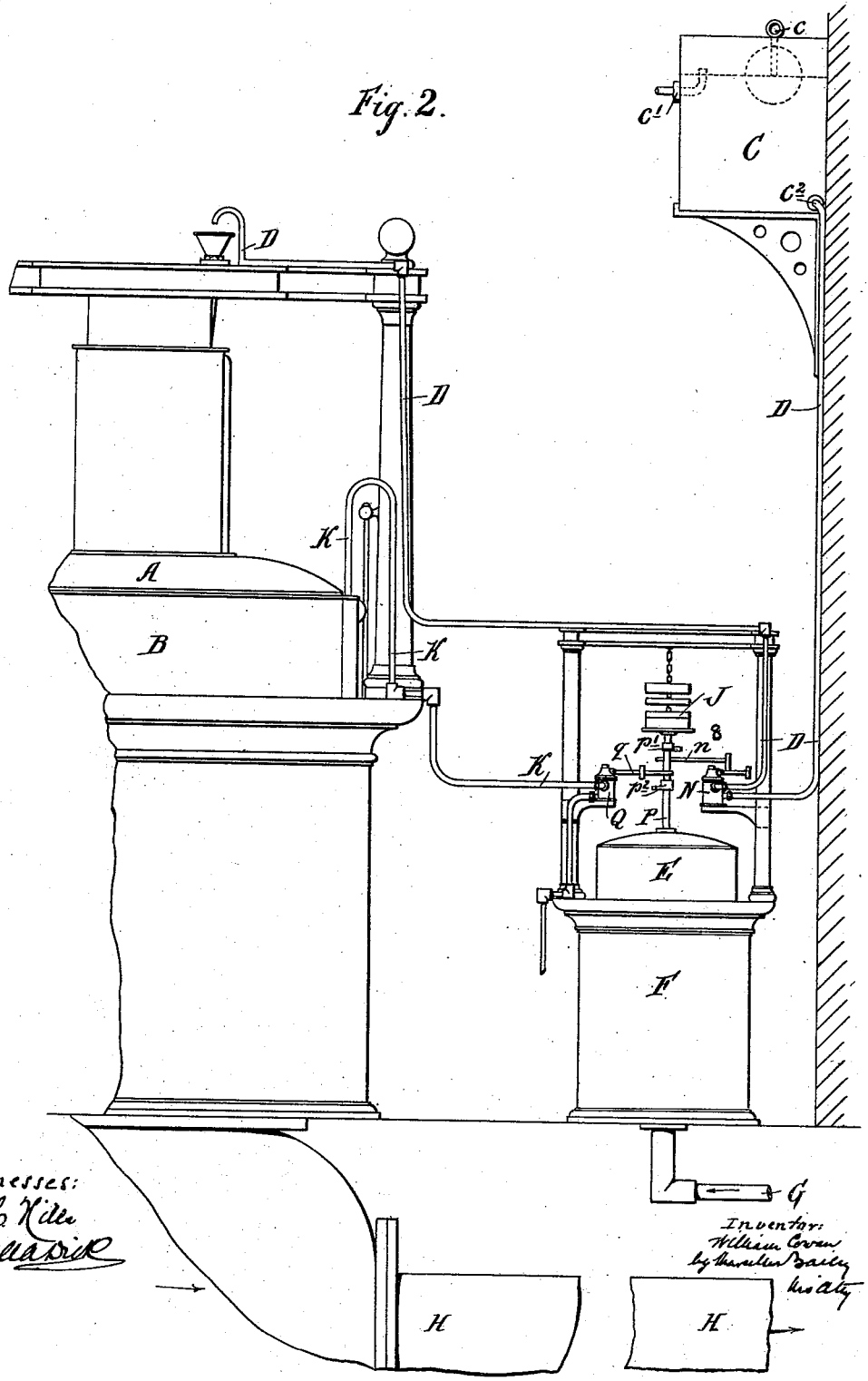

(No Model.) 6 Sheets—Sheet 3.
W. COWAN.
APPARATUS FOR CONTROLLING FLOW AND PRESSURE IN GAS MAINS.
No. 550,218. Patented Nov. 19, 1895.
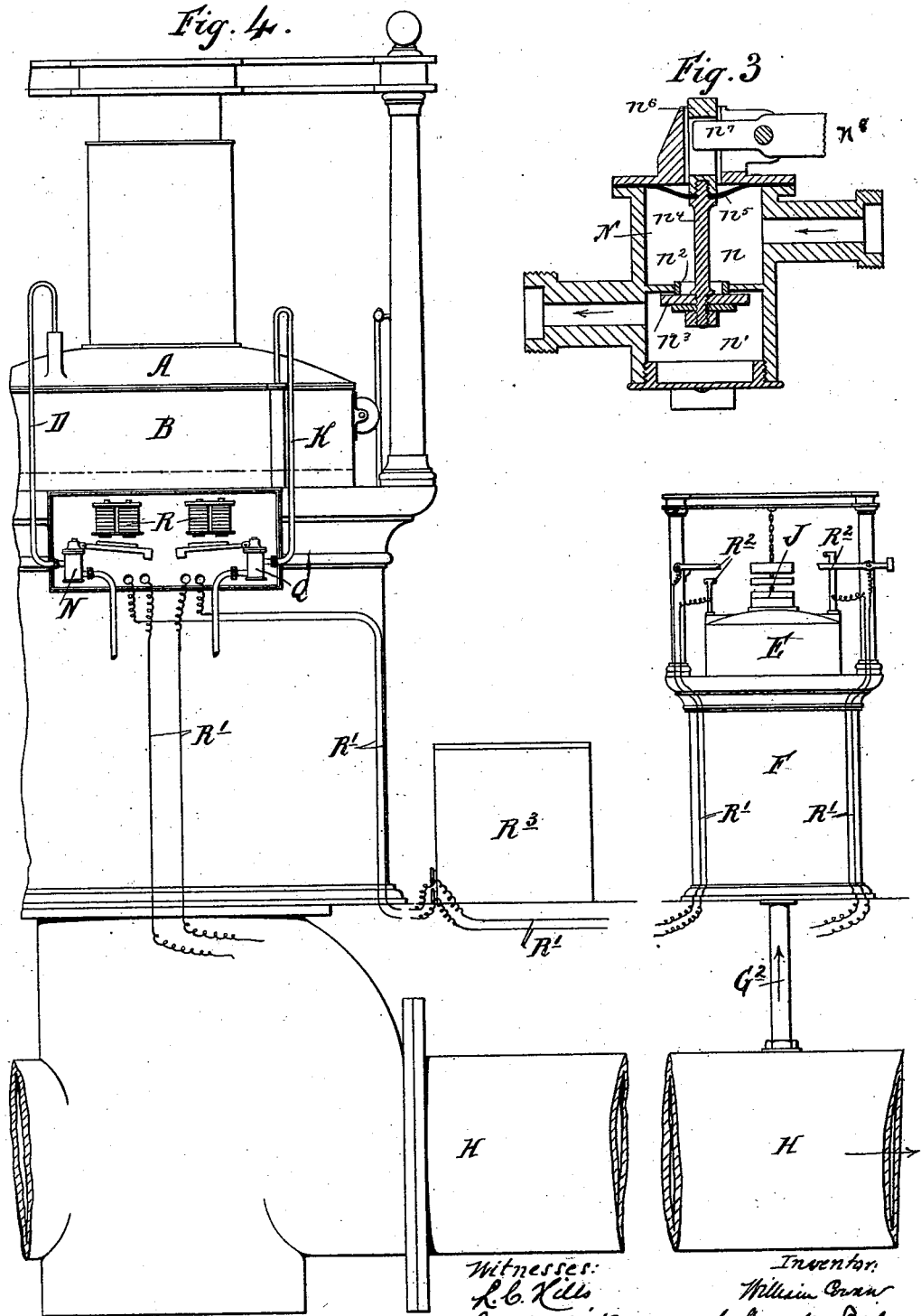

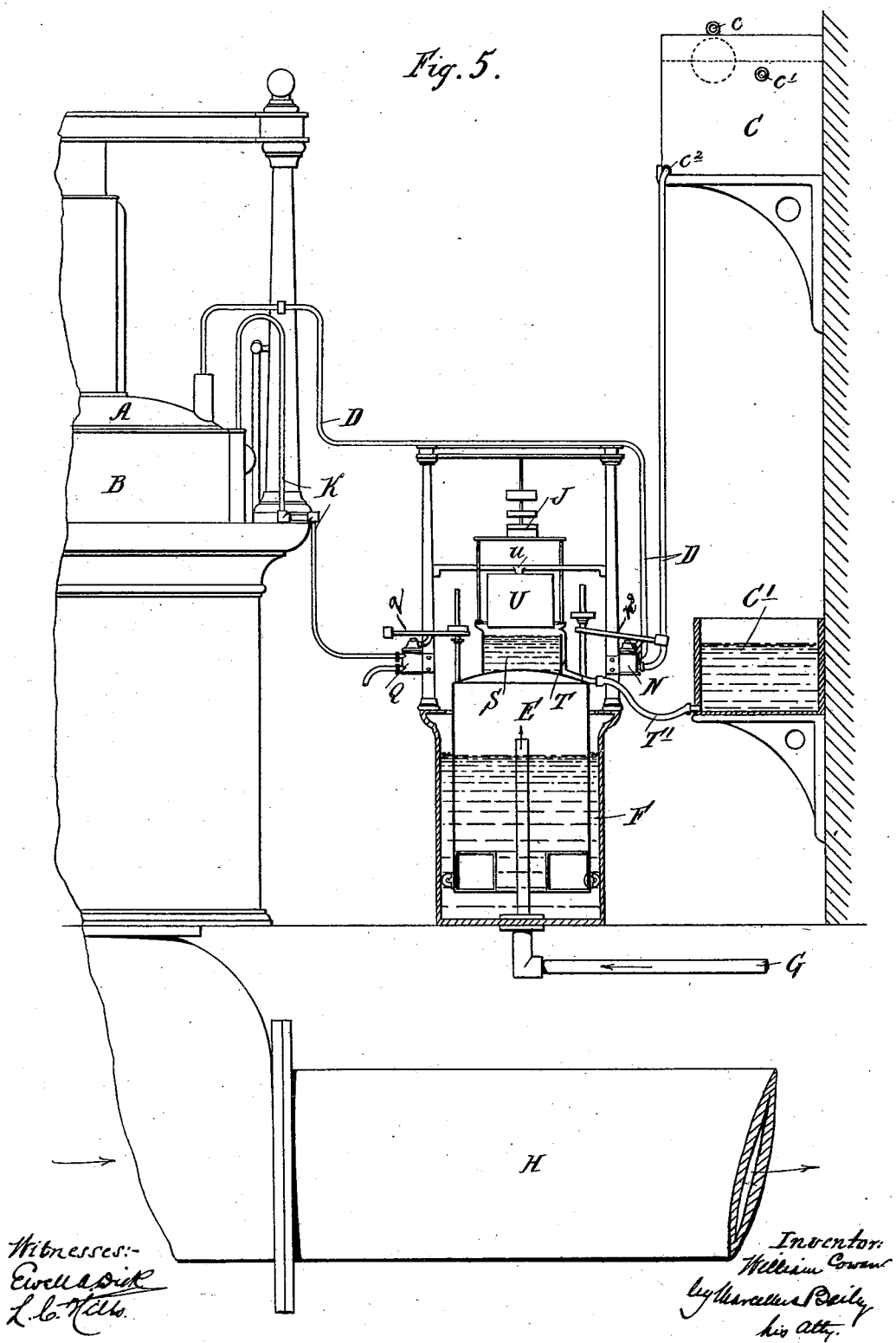

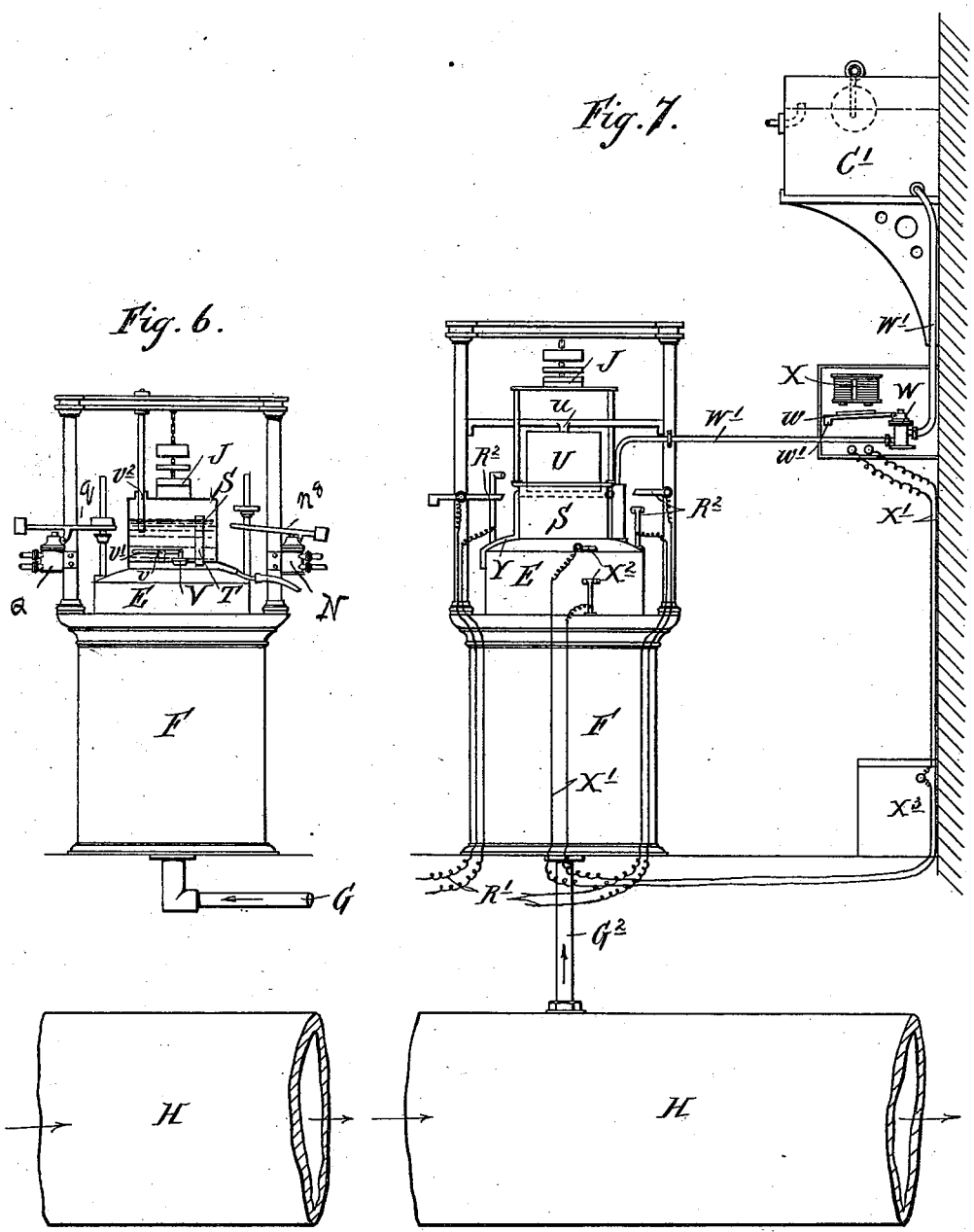

(No Model.) 6 Sheets—Sheet 6.

W. COWAN.
APPARATUS FOR CONTROLLING FLOW AND PRESSURE IN GAS MAINS.

No. 550,218. Patented Nov. 19, 1895.

UNITED STATES PATENT OFFICE.

WILLIAM COWAN, OF EDINBURGH, SCOTLAND.

APPARATUS FOR CONTROLLING FLOW AND PRESSURE IN GAS-MAINS.

SPECIFICATION forming part of Letters Patent No. 550,218, dated November 19, 1895.

Application filed January 4, 1893. Serial No. 457,214. (No model.) Patented in England May 24, 1892, No. 9,829, October 21, 1892, No. 18,555, and November 16, 1892, No. 20,721.

*To all whom it may concern:*

Be it known that I, WILLIAM COWAN, of Buccleuch Street Works, Edinburgh, in the county of Mid-Lothian, Scotland, have invented Improvements in Apparatus for Controlling the Flow and Pressure in Gas-Mains, of which the following is a specification, and for which I have obtained British Letters Patent, No. 9,829, dated May 24, 1892; No. 18,555, dated October 21, 1892, and No. 20,721, dated November 16, 1892.

This invention relates particularly to improvements in means for varying the pressure of gas-governors by automatically varying the load of water or other liquid upon them.

In the automatic pressure-changer or gas-regulator invented and patented by me in Great Britain on the 5th day of July, 1878, No. 2,686, and in the United States of America No. 216,556, filed October 5, 1878, I made the loading and unloading of the governor depend on the combined agency of a clock and the pressure of the gas in the main at a point close to the outlet of the governor.
According to the present invention, the loading and unloading of the governor with water or other fluids are regulated by the degree of pressure of the gas in some part of the main pipe more or less considerably distant from the outlet of the governor. It would of course be futile to attempt to regulate the amount of load by means of the pressure in or adjacent to the governor, because the pressure there depends so exclusively on the amount of load that a change of pressure cannot in an efficient governor precede a change of load; but it is otherwise at a point remote from the governor where friction in the main has so retarded the passage of the increased supply, which an enlarged demand requires, that the pressure may thereby fall in the district, while it is maintained undisturbed at the governor. In like manner though the pressure at the outlet of a thoroughly-efficient governor cannot increase without a change of load it yet may rise in a remote district from a lower degree, to which a large demand may reduce it, to the higher degree to which a smaller demand may allow it to attain. For example, a governor may be loaded to give a certain pressure at its outlet, but in a remote district (of the same level as the governor) this pressure may be reduced very considerably by the combined influence of friction and large demand; but as the draft lessens and the friction diminishes the pressure in that remote part of the main will rise and approximate more and more nearly to the pressure at the outlet of the governor. By utilizing these fluctuations of the pressure it becomes practicable to regulate the load on the governor-bell more or less in proportion to the demand for gas.

My invention consists of and includes the following instrumentalities, which are arranged and combined in somewhat different relations in the different embodiments of my invention, as will be hereinafter pointed out—that is to say, a governor which controls the valve regulating the flow through the main, and which may be of any usual approved construction, means for loading and unloading the governor to cause it to vary the position of the valve, and a controller for the loading and unloading devices having connection through a pressure-pipe with a part of the main distant from the governor, whereby the pressure at such point governs the operation of the controller, and it in turn operates or causes the operation of the said loading and unloading devices. I prefer to use water or some other liquid for the loading of the governor, and the loading and unloading devices control its flow to and from the tank or receptacle for the water which is connected with the governor; and I prefer that the controller for the loading and unloading devices should be a bell, float, or water-sealed gas-holder having connections with the main at the proper place. One controller may be used to control both the loading and the unloading of the governor, or two independent controllers, one for the loading and the other for the unloading, may be used, as desired. In cases where it is desired to shorten the length of said pressure-pipe I may remove the auxiliary gas-holder or controller for the loading and unloading devices (only one being required in this case) to the remote district and connect it there with the main by means of a short length of pressure-pipe. In this case the movements of the bell of the auxiliary gas-holder would be transmitted to the loading and unloading mechanisms of the governor's loading tank by means of a circuit of electricity being established through the medium of a system of electromagnets, conductors, contact-makers, and dynamo or battery.

It is to be understood that where the position of the governor and its loading and unloading controller or gas-holder differs in elevation from the main at the point where the return pressure-pipe joins it such difference of elevation may be allowed for in the adjustment of the weights and other automatic loading arrangements of the gas-holders.

In districts where the pressure is liable to be considerably reduced through friction and such like causes I may provide extra means whereby the apparatus will accordingly regulate their movements so as to suit such variation of pressure in the district. For example, suppose the pressure in the remote district falls below the day minimum pressure of, say, ten-tenths to, say, eight-tenths. This may in some cases be an indication that even ten-tenths is not enough, and that twelve-tenths, fifteen-tenths, or more is required, and to enable this increase to be provided for I not only load and unload the bell of the governor, but also the bell of the auxiliary gas-holder, which controls the loading and unloading of the governor. The bell of said auxiliary gas-holder, is therefore, in accordance with one part of this invention, constructed and arranged in such a manner that it will be automatically loaded and unloaded with water or other liquid according to its requirements, so that with regard to the example above set forth the increase is secured by the bell of the gas-holder taking on a load of water when it falls down and loses, say, the two-tenths of suspended weight, at which point it begins to receive its load. The added weight thus prevents the rise of the gas-holder bell till the pressure rises to the desired degree and overcomes this additional weight.

Instead of employing water-sealed gas-holders to respond to the varying pressure and thereby operate as the controller for the loading and unloading mechanisms, other appliances, such as floats or dry elastic diaphragms, might be used, and I consider these to be the mechanical equivalents one of the other, so far as the broad features of my invention are concerned.

Figure 9:
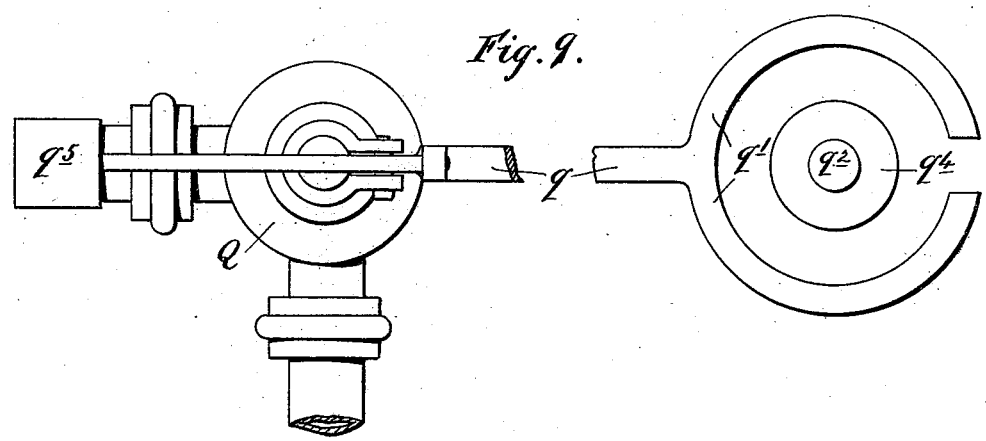
Figure 10:
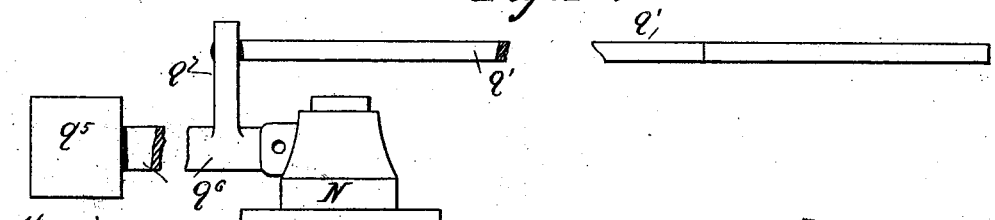

In the drawings, Figure 1 is an elevation, shown partly in section, of one arrangement for carrying out my said invention. Fig. 1ª is a detail view of part of the apparatus shown in Fig. 1. Figs. 2, 4, 5, and 7 are part elevations of other arrangements for carrying out my said invention. Fig. 3 is a sectional elevation of a detail. Fig. 6 is an elevation of a modification of Fig. 5; and Figs. 8, 9, and 10 are enlarged views of details.

As shown in Fig. 1, for the purpose of loading the tank A of the governor-bell B, I employ a water or other cistern C, preferably such as is commonly used in houses in connection with domestic water-supply—that is to say, an ordinary cistern C with a ball-cock $c$ to regulate the flow of liquid into it, a waste-pipe $c'$ to prevent overflow, and the usual outlet $c^2$. To this outlet I attach a flexible or jointed tube D, capable of having its other end raised up above the level of the waste-pipe $c'$, so that when the pipe is in that position all the water which can ever be in the cistern when full will then be retained; but the pipe is also capable of being lowered, so as to allow any quantity or even the whole of the water to pass out. The outlet end of this flexible tube D is supported by a suitable fastening or support $d$, carried by the bell E of an auxiliary gas-holder F in such a way that the position of the bell E determines the escape from or the retention of the water in the cistern C. The gas-holder bell E is the controller for the loading devices and is operated by the pressure of gas transmitted to it through a pipe G, which connects it with a distant part of the main H beyond the outlet of the governor. The rising or the falling of the bell E in response to this pressure is in the first instance determined by its weight, which may be varied according to circumstances; but it is further determined and regulated by an arrangement of suspended weights J coming into and going out of operation. It is obvious that the reduction of the pressure in the remote part of the main H contemplated will bring down the gas-holder bell E, and along with it the outlet end of the flexible tube D, and by this means the failing pressure in the remote district will be restored by the governor receiving an extra load. The flow of water into the governor's loading-tank A will cease when the bell E of the gas-holder F rises in response to the increased pressure and raises the outlet of the flexible tube D up to or above the level of the water in the cistern C. In some cases the flexible tube D may be counterpoised, as shown at $d'$, to prevent its weight materially affecting the gas-holder bell E.

The discharge-outlet of the flexible tube or jointed supply-pipe is led, by means of a pipe D', having funnels or conduits $d^2$, in at the top of the loading-tank A, so as to permit of the water entering into said tank A.

For the purpose of unloading the governor I provide the loading-tank A of the governor-bell B with a flexible or jointed tube K, one end of which is fixed into and communicates with the lower part of the loading-tank A, while the other or outlet end of the tube is supported and carried by the bell L of a small gas-holder M, mounted upon and moving with the governor-bell B. The outlet end of this flexible tube K, Fig. 1ª, is supported by a cord or chain $k$, which passes over a pulley $k'$ on the small gas-holder's cross-bar or other suitable support, so that the other end of the cord or chain $k$ is joined to the bell L of a second controller in the form of the gas-holder M. Hence as the bell L of the gas-holder M rises the outlet end of the flexible tube K lowers and as the bell L of the gas-holder M falls the outlet end of the tube K rises. The level of the water in the loading-tank A of the governor-bell B thus depends on the position of the outlet end of the flexible or jointed tube K, which is determined by the position of the gas-holder bell L. When the bell L is near the bottom, the outlet end of the tube K will then be in its highest position and the maximum load of water, if present, in the loading-tank A will be retained; but when the gas-holder bell L rises and the outlet end of the tube K consequently lowers water will flow out of the loading-tank A in consequence of the higher pressure transmitted to this gas-holder M through its also being in connection, by means of the pipe G′, with the pressure-pipe G, already described in reference to the loading arrangements. This gas-holder M also responds to the pressure in proportion to its weight, and, further, as regulated by the suspended weights J′ similar in action to that which has been described in connection with the loading gas-holder F. The connection between this small gas-holder M, which is carried by the governor-bell B, and the pipe G′, connecting the pressure-pipe G from the remote district main H with this gas-holder M, must either be flexible, as at $g$, or consist of a water-slide lute to admit of the motion the gas-holder has in consequence of its being mounted on the moving bell B of the governor, the discharge-outlet being led into a suitable funnel or conduit-pipe, which passes the water down into the loading-tank A of the governor-bell.

The water-cistern C may be conveniently placed and rest upon the cross-bar or pillar-girder of the governor or gas-holder; but any other suitable position will answer equally well.

Referring to Fig. 2 of the drawings, which illustrates a valve arrangement for loading and unloading the tank A of the governor-bell B, I provide the supply-pipe D, which leads the water or other suitable liquid from the cistern C to the loading-tank A of the governor, with a valve or cock N, preferably formed as shown in Fig. 3—that is to say, I form the valve with two chambers $n\ n'$, the partition between which is provided with the valve-seat $n^2$, against the lower face of which works a valve $n^3$, secured to the lower end of a spindle $n^4$, the upper end of which is attached to the leather or other pliable disk or washer $n^5$, secured at its edges to the top of the valve-case, the spindle being attached, also, at this end to the vertically-movable slotted piece $n^6$, which the pivoted operating-lever $n^7$ engages. The said valve N is provided with a weighted actuating-lever $n^8$, the one end of which is actuated at the proper time by a stop or projecting arm $p'$, secured to a vertical pillar or rod P, which is mounted on the top of the auxiliary gas-holder bell E, which is acted upon by the pressure of gas in the remote district of the main H by means of the pressure-pipe G. The unloading or discharge siphon-pipe K is also connected with another valve Q, the lever $q$ of which is also actuated by a stop or projecting arm $p^2$, secured near the lower end of the pillar or rod P. The said stops $p'\ p^2$ are so arranged as to enable the bell E to pick up or leave off the variable weights J before actuating the valves N and Q. The whole arrangement thus forms an efficient working apparatus for loading and unloading the governor, the load of which is automatically varied, according to the requirements of the remote district, through the medium of the pressure in the remote district actuating the gas-holder bell E, and so operating one or other of the valves N and Q; also, in this arrangement I dispense with the use of an auxiliary small gas-holder on the bell of the governor for unloading the tank of the governor.

In carrying out my invention as regards the system of electromagnets and conductors I proceed as is shown in Fig. 4—that is to say, I remove the auxiliary gas-holder or controller F to the remote district and connect it to the main H by means of a short length of pipe $G^2$, thus dispensing with the length of pressure-piping that would be necessary were the controller placed alongside the governor.

In order to enable the rise and fall of the gas-holder bell E in the remote district to actuate the supply and discharge pipe valves N and Q of the governor, I provide a system of electromagnets R, conductors R′, contact-makers $R^2$, and battery or dynamo $R^3$, as shown. The said magnets R are caused to open or shut the valves N and Q on the completion of a circuit being established through the one or other of the contact-makers $R^2$, coming into action as the gas-holder bell E rises or falls, according to the demand in the remote district. The bell E of the gas-holder may be provided with a variable-weight arrangement J, as hitherto, and which weights it would either pick up or leave off before any of the contact-makers $R^2$ come into action. The valves N and Q are preferably of the same kind as shown in Fig. 3.

It will be evident that the electric system just described could be made to operate the loading and unloading devices through other means than the valves N and Q; but I do not consider it necessary to illustrate or describe more than the one arrangement shown.

It will thus be seen that in either of the foregoing arrangements the loading and unloading of the governor will be entirely dependent on the actual pressure of the gas in the main of the remote district and that should alteration of pressure take place the governor will be automatically loaded or unloaded, as required, to meet such alteration.

Referring to Fig. 5 of the drawings, in which I have shown an apparatus such as has been described and is shown in Fig. 2 of the drawings—that is to say, an apparatus having an arrangement of valves for loading and unloading the tank A of the governor—I provide the bell E of the auxiliary gas-holder or controller with a loading-tank S of the ordinary construction. The said tank is provided with a stand-pipe T, the lower end of which is connected to a fixed or stationary cistern C' by means of a flexible-tube arrangement T' in such a manner that on the bell E falling, owing to an alteration of pressure in the remote district, the top end of the stand-pipe T comes down below the level of the water in the cistern C' and so permits of the water running from said cistern C' to the tank S of the gas-holder F, thus loading the said holder.

In order to unload the tank S of the gas-holder F when necessary, I provide a displacer U, which may be mounted on a fixed bar or bridge $u$ in such a manner that on the bell E rising the displacer U dips into the tank S and so forces the water back into the cistern C' through the stand-pipe T and connection T' and so unloads the bell of the gas-holder, according to the requirements of the district. In lieu of the said displacer U, I may, if desired, employ a suitable valve V, as shown in Fig. 6, the said valve V being located near the bottom of the tank S and provided with an actuating-lever $v$, the one end $v'$ of which would, at a certain point of the bell's ascent, be pressed against a fixed or elastic obstruction $v^2$, so as to open the said valve V and so unload the bell E of the gas-holder.

I have hereinbefore adverted to the reason why it is desirable to provide means for loading the controller for the governor loading and unloading devices. When the controller-bell is loaded, it is prevented from rising, and hence the governor-valve is kept open until the pressure in the remote district sufficiently rises to overcome the additional weight, which pressure is somewhat above the normal pressure of such district. When the bell E descends beyond a certain point, water flows into the tank S from the cistern; but on the bell ascending the stand-pipe T prevents any water leaving the loading-tank until it is forced out by the displacer U or upon the opening of the valve V. The pressure in the district in which the controller is situated or with which it is connected must, therefore, rise above the normal to, say, twelve or fifteen tenths of an inch before the bell of the controller will rise sufficiently far to unload the governor, although the valve which controls the loading of the governor has been closed during the earlier portion of the lifting of said bell. When the controller-bell rises against its load sufficiently to cause the displacer or the valve V to operate, it indicates that the time during which the comparatively-high pressure was required has passed and that the parts of the apparatus should assume their positions to maintain normal pressure.

Referring to Fig. 7 of the drawings, I have shown an apparatus arranged so that the gas-holder which actuates the loading and unloading valves of the governor is placed in the remote district and communicates the motion given to it by the variation of the pressure of the gas in the main H of the remote district by means of a system of electric conductors, magnets, contact-makers, and dynamo or battery. In this arrangement I dispense with the stand-pipe and flexible-tube connection between the loading-tank S of the gas-holder bell E and the cistern C' and in lieu thereof I employ a valve W, as shown, the said valve W being mounted in any convenient part of the supply-pipe W' from the cistern and having its lever $w$ so made and arranged as to be operated upon, when required, by the electromagnets X, which come into action on the completion of a circuit of electricity being effected by means of the conductors X', contact-makers $X^2$, and dynamo or battery $X^3$, the said contact-makers being caused to act so as to effect the opening of said valve W by the falling of the bell E in response to the pressure of the gas, and when the circuit is broken the counterpoise-weight $w'$ on the lever $w$ closes the said valve W. The unloading in this case is effected by the displacer U forcing the water out through the overflow or outlet pipe Y as the bell rises.

It is to be understood that according to my present invention I may use the flexible-tube arrangement of loading and unloading the tank of the gas-holder bell E, as shown in Fig. 6, in combination with the governor arrangement, as shown in Fig. 4, or I may use the electric-circuit arrangement of loading and unloading the tank of the gas-holder bell, as shown in Fig. 7, in combination with the governor arrangement, as shown in Fig. 6; also, if desired, I may use any of said arrangements for loading and unloading the gas-holder bell in combination with the flexible-tube arrangement of governor, as shown in Fig. 1, certain modifications of details being made to suit the requirements of the case; also, in accordance with my present invention, I provide the loading and unloading valves of the governor with means whereby the rise or fall of the bell E of the gas-holder F not only opens the valves, but keeps them open through the rest of the rise or fall of the bell E, as the case may be.

According to one arrangement of such, as is shown in elevation and plan, Figs. 8 and 9, of the siphon or discharge valve Q, I provide the weighted lever $q$ with a fork $q'$ at its outer end, the said fork being so arranged as to pass around the upright rod $q^2$ of the auxiliary gas-holder bell, so that on the bell rising the rod $q^2$ lifts up the circular weight $q^3$ by means of its adjustable table $q^4$, thus leaving the valve Q free to be opened by the counterpoise-weight $q^5$ of the lever $q$, the valve remaining open so long as the weight $q^3$ remains on the table $q^4$ and off the fork $q'$ of the lever; also, as shown in part elevation, Fig. 10, I arrange the supply-valve N in such a manner that the valve will operate in any reverse manner to that of the valve Q, so that it will be opened by the weight coming off the table onto the fork of the lever $q'$ and the valve closed when the weight leaves the fork by the counterpoise-weight $q^5$—that is to say, in lieu of the end of the fork-lever $q'$ operating the valve-spindle it is the lever $q^6$ of the counterpoise-weight $q^5$ that does so, the said fork-lever $q'$ being secured at its end to the upright piece $q^7$ of the lever $q^6$, as shown; or I may actuate valves Q and N by means of an upright rod mounted on the top of the bell E of the gas-holder F and provide the said rod with ridges or bearing-surfaces, which would bear against the ends of the levers $q$ and $n$ and so actuate the respective valve according to the rise or fall of the bell.

I claim—

1. The combination with a gas main, and the governor thereof, of a load controller distinct from and independent of the governor and connected with and operated by the pressure in the main at a point in a district somewhat remote from the governor, and devices controlled by said controller for loading and unloading the governor with a liquid, whereby the variations in the load of the governor are effected by the controller alone and are unaffected by variations in pressure at the governing point, substantially as hereinbefore set forth.

2. The combination with a gas main and the governor thereof, of a lqiuid receptacle or tank carried by the bell of the governor, a source of liquid supply connected to said receptacle, a discharge through which said receptacle may be emptied, and a load controller distinct from and independent of the governor and connected with and operated by the pressure in the main at a point distant from the governor, and means controlled by said controller for admitting the liquid load to and permitting its discharge from the tank on the governor bell whereby the variations in load are influenced by the controller alone without reference to pressure variations at the governing point, substantially as hereinbefore set forth.

3. The herein described means for loading and unloading the controller of a gas main governor with a fluid, consisting of the tank carried by the bell or float of the controller, the cistern from which the tank is filled when the bell falls, the overflow pipe T and the displacer which dips into the fluid within the tank when the bell rises, substantially as and for the purposes hereinbefore set forth.

4. The herein described means for loading and unloading the controller of a gas main governor with a fluid, consisting of the tank carried by the bell or float of the controller, the cistern from which the tank is filled when the bell falls, the electrically operated valve W in the pipe connecting the tank and cistern, the electric circuit whereby said valve is operated and which is completed when the bell falls and broken when it rises, and the means for emptying the tank operated when the bell rises, substantially as and for the purposes hereinbefore set forth.

In testimony whereof I have signed my name to this specification in the presence of two subscribing witnesses.

WILLIAM COWAN.

Witnesses:
JAMES YATE JONHSON,
DUNDAS PORTEOUS MCKINLAY.